United States Patent
Eto et al.

(10) Patent No.: US 12,279,081 B2
(45) Date of Patent: Apr. 15, 2025

(54) INFORMATION PROCESSING APPARATUS, INFORMATION PROCESSING METHOD, COMPUTER-READABLE RECORDING MEDIUM, AND INFORMATION PROCESSING SYSTEM

(71) Applicant: YOKOGAWA ELECTRIC CORPORATION, Tokyo (JP)

(72) Inventors: Tomoaki Eto, Tokyo (JP); Sawako Ishihara, Tokyo (JP); Hayato Waki, Tokyo (JP); Ken Muramatsu, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 17/679,250

(22) Filed: Feb. 24, 2022

(65) Prior Publication Data

US 2022/0303649 A1    Sep. 22, 2022

(30) Foreign Application Priority Data

Mar. 19, 2021    (JP) ................................. 2021-046548

(51) Int. Cl.
*H04Q 9/02*    (2006.01)
*H04Q 1/20*    (2006.01)

(52) U.S. Cl.
CPC ................. *H04Q 9/02* (2013.01); *H04Q 1/20* (2013.01)

(58) Field of Classification Search
CPC .................................... H04Q 9/02; H04Q 1/20
See application file for complete search history.

(56) References Cited

U.S. PATENT DOCUMENTS

| | | | |
|---|---|---|---|
| 2013/0166041 A1 | 6/2013 | Nishi et al. | |
| 2014/0245236 A1* | 8/2014 | Kimura | G06F 3/04883 715/863 |
| 2018/0286033 A1 | 10/2018 | Ishiyama et al. | |
| 2019/0392241 A1* | 12/2019 | Eto | G06F 11/327 |
| 2021/0133454 A1* | 5/2021 | Sakamoto | G06V 20/20 |
| 2021/0390490 A1* | 12/2021 | Lee | G06Q 10/06395 |

FOREIGN PATENT DOCUMENTS

| | | |
|---|---|---|
| CN | 103176444 A | 6/2013 |
| CN | 110647444 A | 1/2020 |
| JP | 2018031599 A | 3/2018 |
| JP | 2018-185616 A | 11/2018 |
| WO | 2017057448 A1 | 4/2017 |

OTHER PUBLICATIONS

Chinese Office Action (CNOA) dated Oct. 10, 2023 issued in Chinese patent application No. 202210171525.6 and its English machine translation.

* cited by examiner

*Primary Examiner* — Patrick N Edouard
*Assistant Examiner* — Eboni N Giles
(74) *Attorney, Agent, or Firm* — RANKIN, HILL & CLARK LLP

(57) ABSTRACT

An information processing apparatus includes a processing unit that generates an operation log of an operation target device operated by a user, by identifying an operation content of the operation target device, based on a captured image obtained by capturing an image of the operation target device, and operation pattern information of a model of the operation target device.

14 Claims, 14 Drawing Sheets

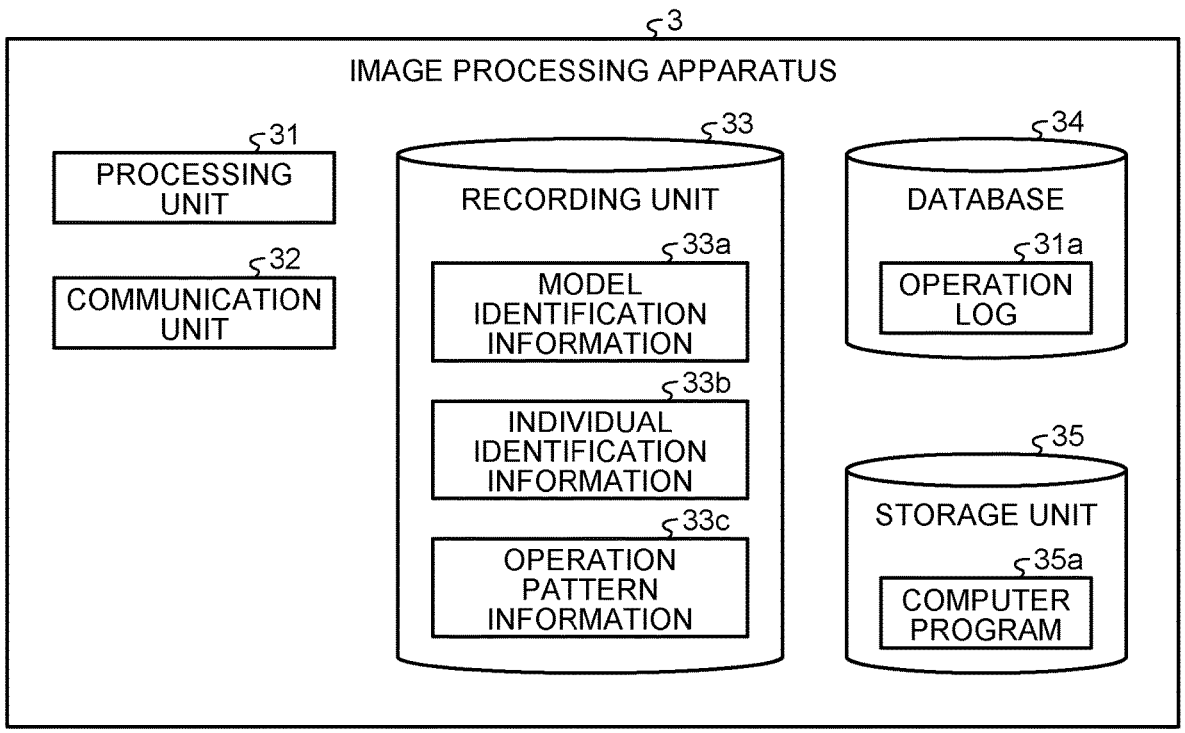

33b

| MODEL | INDIVIDUAL INFORMATION | INDIVIDUAL IDENTIFICATION IMAGE |
|---|---|---|
| xxx | xxx-001 |  ... |
| | ... | ... |

33c

| MODEL | IMAGE-DERIVED INFORMATION | | OPERATION CONTENT |
|---|---|---|---|
| xxx | OPERATION PART  | BUTTON A | Y1 |
| | | ... | |
| | | ICON A | Y2 |
| | | ... | |
| | DISPLAY | CHARACTER STRING A | Y3 |
| | | ... | ⋮ |
| | | TOUCH FEEDBACK A | |
| | | ... | |
| | | IMAGE TRANSITION A | |
| | | ... | |

31a

| INDIVIDUAL INFORMATION | TIME | OPERATION CONTENT |
|---|---|---|
| xxx-001 | t1 | y1 |
| | t2 | y2 |
| | t3 | y3 |
| | ... | ... |
| | | |

INFORMATION PROCESSING APPARATUS, INFORMATION PROCESSING METHOD, COMPUTER-READABLE RECORDING MEDIUM, AND INFORMATION PROCESSING SYSTEM

CROSS-REFERENCE TO RELATED APPLICATION

The present application claims priority to and incorporates by reference the entire contents of Japanese Patent Application No. 2021-046548 filed in Japan on Mar. 19, 2021.

FIELD

The present invention relates to an information processing apparatus, an information processing method, an information processing program, and an information processing system.

BACKGROUND

For example, it has been known that a device such as a flowmeter is provided in a plant (see Japanese Patent Application Laid-open No. 2018-185616).

There is a device that cannot generate or output an operation log. For example, such a device cannot save an operation log because of limited storage capacity, or cannot transmit an operation log to the outside due to limited power consumption and the like.

An object of the present invention is to obtain an operation log of a device, even if the device cannot generate or output an operation log.

SUMMARY

According to one aspect of embodiments, an information processing apparatus comprises a processing unit that generates an operation log of an operation target device operated by a user, by identifying an operation content of the operation target device, based on a captured image obtained by capturing an image of the operation target device, and operation pattern information of a model of the operation target device.

According to one aspect of embodiments, an information processing method comprises generating an operation log of an operation target device operated by a user, by identifying an operation content of the operation target device, based on a captured image obtained by capturing an image of the operation target device, and operation pattern information of a model of the operation target device.

According to one aspect of embodiments, a computer-readable recording medium stores therein an information processing program that causes a computer to execute a process of generating an operation log of an operation target device operated by a user, by identifying an operation content of the operation target device, based on a captured image obtained by capturing an image of the operation target device, and operation pattern information of a model of the operation target device.

According to one aspect of embodiments, an information processing system comprises an image capturing device that captures an image of an operation target device operated by a user, and an information processing apparatus that generates an operation log of the operation target device, by identifying an operation content of the operation target device, based on a captured image of the operation target device captured by the image capturing device, and operation pattern information of a model of the operation target device.

BRIEF DESCRIPTION OF THE DRAWINGS

FIG. 4 is a diagram illustrating an example of a schematic configuration of an information processing apparatus;

FIG. 5 is a diagram illustrating an example of model identification information;

DESCRIPTION OF EMBODIMENTS

Figure 1:
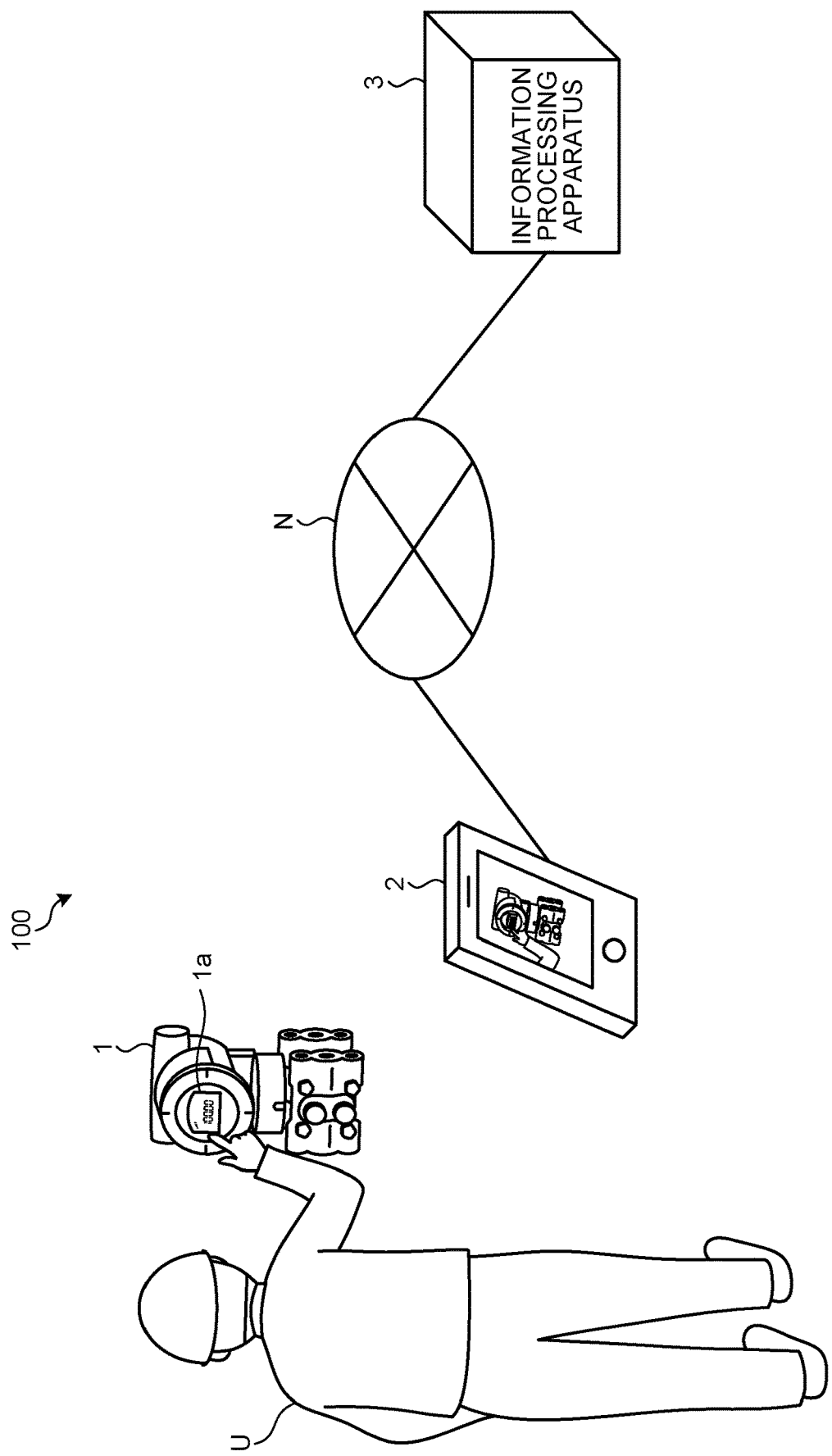
FIG. 1 is a diagram illustrating an example of a schematic configuration of an information processing system according to an embodiment.

Hereinafter, an embodiment will be described with reference to the accompanying drawings. The same reference numerals denote the same components, and repeated descriptions will be omitted as appropriate.

FIG. 1 is a diagram illustrating an example of a schematic configuration of an information processing system according to an embodiment. An information processing system 100 generates an operation log of a device 1 operated by a user U. There may be various types of the device 1. For example, the device 1 may be a flowmeter, a pressure gauge, a thermometer, and the like provided in a plant and the like. In this case, the user U may be an operator (an on-site worker and the like) of the plant. In FIG. 1, the user U is manually operating the device 1 while viewing a display screen 1*a* of the device 1. The display screen 1*a* may be a touch panel, and in this case, the user U operates the device 1 by touching the display screen 1a. The device 1 may not be able to generate, save, or output an operation log, for example.

The information processing system 100 includes an image capturing device 2 and an information processing apparatus 3. The image capturing device 2 and the information processing apparatus 3 are configured to be communicable with each other. In this example, the image capturing device 2 and the information processing apparatus 3 are connected to each other via a network N. For example, the network N is the Internet, a wide area network (WAN), a local area network (LAN), and the like.

The image capturing device 2 is an apparatus having an image capturing function. For example, the image capturing device 2 is a smartphone, a tablet terminal, a laptop, a personal computer (PC), and the like provided with a camera and the like. The image capturing device 2 will be described with reference to FIG. 2.

Figure 2:
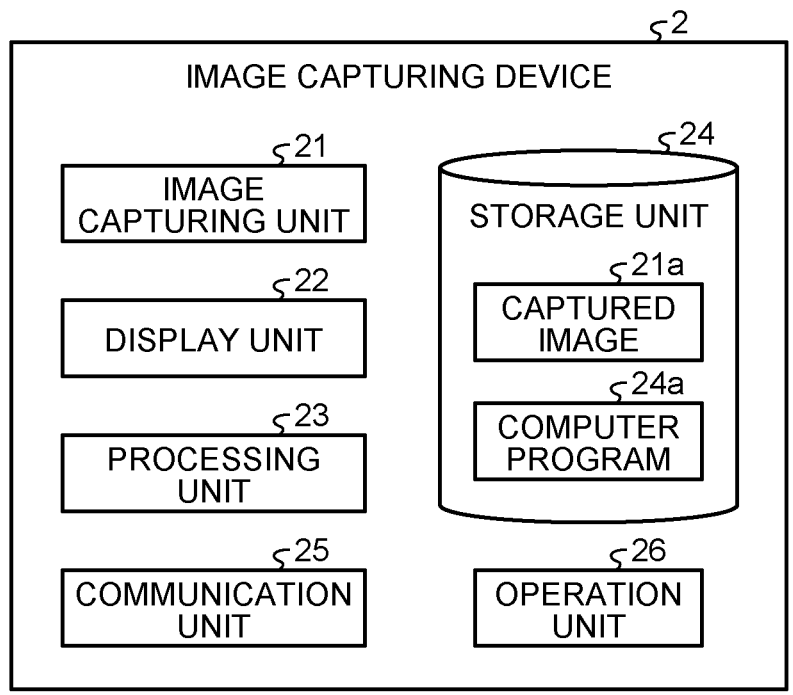
FIG. 2 is a diagram illustrating an example of a schematic configuration of an image capturing device.

FIG. 2 is a diagram illustrating an example of a schematic configuration of an image capturing device. The image capturing device 2 includes an image capturing unit 21, a display unit 22, a processing unit 23, a storage unit 24, a communication unit 25, and an operation unit 26.

A captured image of the image capturing unit 21 is referred to as a captured image 21a. The captured image 21a is an image obtained by capturing an image of the device 1. For example, the captured image 21a is an image for identifying the model of the device 1, an image for identifying individual devices 1, an image for identifying the operation content of the device 1, and the like. The details will be described below.

In the present disclosure, an "image" and "image capturing" may also mean "video" and "filming". In the following explanation, the "image" and "image capturing" may also be read as the "video" and "filming" as appropriate within a range not departing from the gist of the present disclosure. The image may be a photograph, a screen shot, a scanned image, a video frame, or an image created by a content authoring application.

Figure 3:
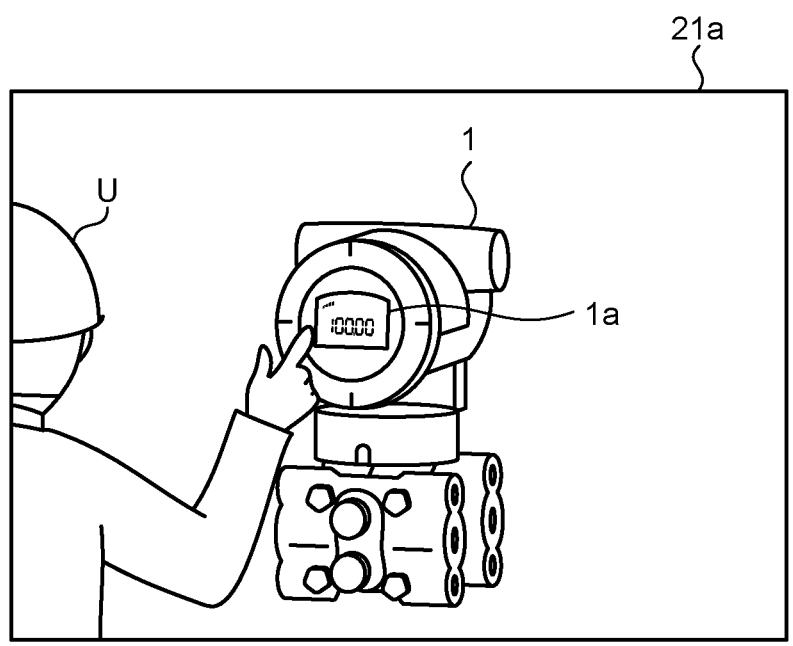
FIG. 3 is a diagram illustrating an example of a captured image.

FIG. 3 is a diagram illustrating an example of a captured image. For example, the captured image 21a is an image for identifying the operation content of the device 1 (for example, a frame of video). The device 1 is operated by the user U. The captured image 21a may also include information on the image capturing time.

Returning to FIG. 2, the display unit 22 displays various types of information. For example, the display unit 22 displays the captured image of the image capturing unit 21 in real time. Moreover, the display unit 22 also displays information useful for the user operation, or display the generated operation log (which will be described below) of the device 1.

The processing unit 23 executes various processes on the generation of an operation log of the device 1. Unless otherwise specified, the image capturing device 2 described in the present disclosure is operated, when the components of the image capturing device 2 are controlled (when the entire image capturing device 2 is controlled) by the processing unit 23.

The storage unit 24 stores various types of information necessary for the process performed in the image capturing device 2. For example, the information stored in the storage unit 24 includes the captured image 21a and a computer program 24a. The captured image 21a is as described above. The computer program 24a is a computer program that causes a computer to execute a process of the image capturing device 2. For example, the application relating to the operation log generation of the device 1 is executed by the computer program 24a.

The communication unit 25 communicates with the information processing apparatus 3. Information can be transmitted and received between the image capturing device 2 and the information processing apparatus 3. For example, the communication unit 25 transmits the captured image 21a to the information processing apparatus 3. The captured image 21a may be captured by the image capturing unit 21, and transmitted to the information processing apparatus 3 in real time. Alternatively, the captured image 21a may be retrieved from the storage unit 24 at any time, and transmitted to the information processing apparatus 3. The communication unit 25 also transmits the user information described above and the like, to the information processing apparatus 3.

The transmission of the captured image 21a to the information processing apparatus 3 will be further described. Only a part of the captured image 21a of the image capturing unit 21 may be transmitted to the information processing apparatus 3. For example, in the captured image 21a, the processing unit 23 only extracts an image of a portion (a frame or the like) necessary for identifying the model, identifying the individual, and identifying the operation content of the device 1 (performs segmentation of moving images or the like). For example, if the image is necessary for identifying the operation content, the processing unit 23 may only extract an image indicating a change in the display screen 1a of the corresponding device 1, before and after the operation. The processing unit 23 may only extract an image including a finger, a touch pen, and the like. The image may be automatically extracted using a known image recognition technology and the like, or by user operation. The communication unit 25 transmits the extracted image to the information processing apparatus 3. If the amount of change of the captured image 21a in the screen (video screen) is a predetermined amount or less, the communication unit 25 may not transmit the extracted image to the information processing apparatus 3. Thus, the communication load is reduced.

The process such as image extraction performed by the processing unit 23 as described above is optional. When all the captured images 21a of the image capturing unit 21 are automatically transmitted to the information processing apparatus 3, the process such as image extraction will become unnecessary, thereby reducing the processing load of the processing unit 23.

The operation unit 26 processes the operation (user operation) of the image capturing device 2 by the user U. If the display unit 22 describe above includes a touch panel display and the like, part or all of the functions of the operation unit 26 may be incorporated into the display unit 22.

Returning to FIG. 1, the information processing apparatus 3 generates an operation log of the device 1, on the basis of the captured image 21a transmitted from the image capturing device 2. The information processing apparatus 3 will be described with reference to FIG. 4.

FIG. 4 is a diagram illustrating an example of a schematic configuration of an information processing apparatus. The information processing apparatus 3 includes a processing unit 31, a communication unit 32, a recording unit 33, a database 34, and a storage unit 35.

The processing unit 31 executes various processes on the generation of the operation log of the device 1. Unless otherwise specified, the information processing apparatus 3 described in the present disclosure is operated, when the components of the information processing apparatus 3 are controlled (when the entire information processing apparatus 3 is controlled) by the processing unit 31. The details will be described below.

The communication unit 32 communicates with the communication unit 25 of the image capturing device 2. Information can be transmitted and received between the information processing apparatus 3 and the image capturing device 2. For example, the communication unit 32 receives the captured image 21*a* transmitted from the communication unit 25 of the image capturing device 2, and transmits the operation log generated by the processing unit 31 to the communication unit 25 of the image capturing device 2.

The recording unit 33, the database 34, and the storage unit 35 each record, register (save), and store various types of information necessary for the process performed in the information processing apparatus 3, and the like. For example, although not limited, when viewed from the processing unit 31, the recording unit 33 may be a recording unit for Read. The database 34 may be a database for Read/Write. The storage unit 35 may be a storage unit for Read or a storage unit for Read/Write.

Examples of information to be recorded in the recording unit 33 include model identification information 33*a*, individual identification information 33*b*, and operation pattern information 33*c*. The model identification information 33*a* is information used for identifying the model of the device 1 from the captured image. For example, the "model" is identified by the type name of the device 1, version information of the device 1, product ID, and the like. Even if the type name, version information, product ID, and the like may not be completely the same, a plurality of the devices 1 that are operated and driven in substantially the same manner may be treated as the same model.

FIG. 5 is a diagram illustrating an example of model identification information. For example, the model identification information 33*a* is information in which the "model" and a "model identification image" are associated (linked) with one another. In this example, the "model" is schematically illustrated as "xxx" and the like. The "model identification image" is an image that can identify the model of the device 1. In FIG. 5, some appearance images of the device 1 are illustrated as the model identification image.

Returning to FIG. 4, the individual identification information 33*b* is information used for identifying the individual information of the device 1 from the captured image 21*a*. The individual information is information that can uniquely identify the device 1, and for example, a product number (serial number and the like), a tag name, and the like.

Figure 6:
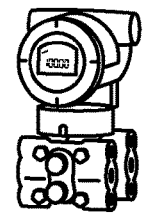
FIG. 6 is a diagram illustrating an example of individual identification information.

FIG. 6 is a diagram illustrating an example of individual identification information. For example, the individual identification information 33*b* is information in which the "model", "individual information", and an "individual identification image" are associated with one another. The "model" is as described above. In this example, the "individual information" is schematically illustrated as "xxx-001" and the like. The "individual identification image" is an image that can identify the individual information of the device 1. The individual identification image may be an image illustrating a unique feature of the device 1. For example, the devices 1 of the same model may have outer shapes different from each other, and an image including such a portion is used as the individual identification image. Examples of the different outer shapes include unevenness and the like.

Returning to FIG. 4, the operation pattern information 33*c* is information for identifying the operation content of the device 1 from the captured image 21*a*. For example, the operation pattern information 33*c* is prepared for each model.

Figure 7:
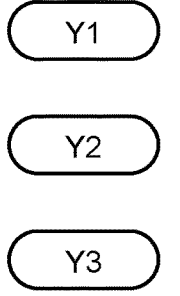
FIG. 7 is a diagram illustrating an example of operation pattern information.

FIG. 7 is a diagram illustrating an example of operation pattern information. For example, the operation pattern information 33*c* is information in which the "model", "image-derived information", and "operation content" are associated with one another. The "model" is as described above. The "image-derived information" is information that can be obtained from an image of the device of the model. Examples of the image-derived information include an "operation part" and "display".

The "operation part" illustrates the operation part of the device. Examples of the operation part include a button to be pressed, an icon to be selected, and the like. In the drawing, the "operation part" is schematically illustrated as a "button A", an "icon A", and the like. The button may be a hardware button (physical button) or a software button.

The "display" illustrates the display of the device. Examples of the display include a character string (including a numeric character and the like) displayed on a display screen of the device, touch feedback on the display screen (a change in the button background color of a touch panel while the touch panel is being touched and the like), screen transition of the display screen, and the like. In the drawing, the display is schematically illustrated as a "character string A", "touch feedback A", a "screen transition A", and the like. The screen transition will be described with reference to FIG. 8.

Figures 8, 9:
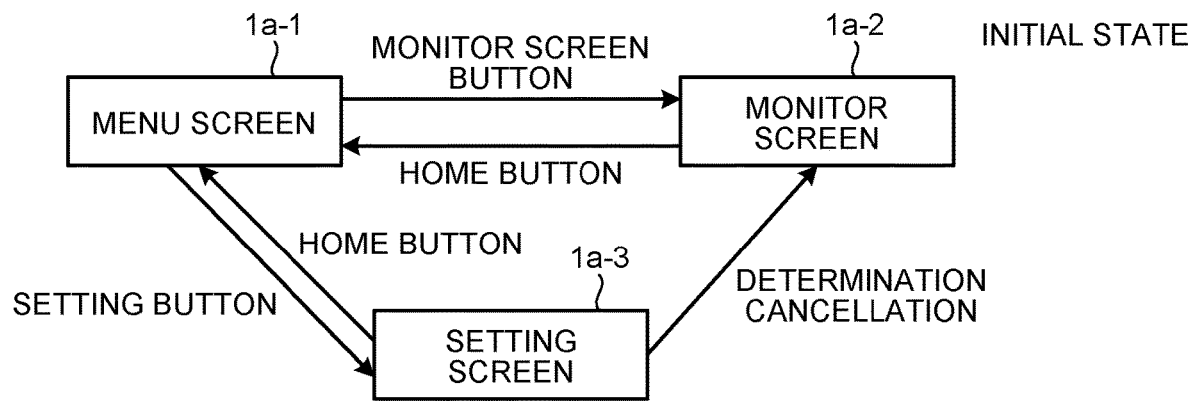
FIG. 8 is a diagram illustrating an example of screen transition.
FIG. 9 is a diagram illustrating an example of an operation log.

FIG. 8 is a diagram illustrating an example of screen transition. The display screen of the device is changed between various screens such as a menu screen 1*a*-1, a monitor screen 1*a*-2, and a setting screen 1*a*-3. Because the screen is changed by user operation, an operation content is associated with the screen transition. In this example, pressing a "monitor screen button" is associated with the screen transition from the menu screen 1*a*-1 to the monitor screen 1*a*-2. Pressing a "home button" is associated with the screen transition from the monitor screen 1*a*-2 to the menu screen 1*a*-1. Pressing a "setting button" is associated with the screen transition from the menu screen 1*a*-1 to the setting screen 1*a*-3. Pressing a "home button" is associated with the screen transition from the setting screen 1*a*-3 to the menu screen 1*a*-1. Execution of "determination" or "cancellation" is associated with the screen transition from the setting screen 1*a*-3 to the monitor screen 1*a*-2.

There may be various screens in addition to the menu screen 1*a*-1, the monitor screen 1*a*-2, and the setting screen 1*a*-3 described above. Examples of the other screen include a communication screen and the like.

Returning to FIG. 7, the "operation content" indicates the operation content of the device 1. In this example, the operation content is schematically illustrated as "Y1" and the like. The operation content is associated with single image-derived information or a combination of a plurality of pieces of image-derived information. For example, a certain operation content (such as determination) is associated with pressing a certain button (such as a button A). A certain operation content (such as the execution of a process indicated by the character string A) may be associated with a combination of displaying a certain character string (such as a character string A) and pressing a certain button (such as a button A). For example, the color change of the character string "save setting", which is displayed on the display screen of the device, to the color of the touch feedback, is associated with the operation content of executing the setting. These are mere examples, and various types of image-derived information and/or a combination of the various types of image-derived information, and various operation contents may be associated with one another.

In addition to the above, various types of information useful for identifying the operation content of the device 1 from the captured image 21a are included in the operation pattern information 33c. For example, a pattern of a pointer (a finger, a touch pen, and the like) used for screen operation may also be included in the operation pattern information 33c as the image-derived information. The gesture of the user U and the like may also be included in the operation pattern information 33c as the image-derived information. Rotating the rotary switch provided in the device 1, dragging on a touch panel, flicking on a touch panel, and the like may also be included in the operation pattern information 33c as the image-derived information.

Returning to FIG. 4, for example, the model identification information 33a, the individual identification information 33b, and the operation pattern information 33c as described above are recorded in the recording unit 33. For example, these pieces of information are obtained prior to the shipment of the device 1 and the like, and recorded in the recording unit 33.

Examples of the information to be stored in the database 34 include an operation log 31a. The operation log 31a indicates the operation history of the device 1. The operation log 31a is generated by the processing unit 31, as will be described below.

FIG. 9 is a diagram illustrating an example of an operation log. For example, the operation log 31a is described by associating "individual information", "time", and "operation content" with one another. The "individual information" and the "operation content" are as described above. The "time" indicates the operation time (date and time, and the like), and in this example, is schematically illustrated as "t1" and the like.

In the operation log 31a, the description of the individual information is optional. In the operation log 31a, the individual information may not be included. Alternatively, the model may be included instead of the individual information.

Returning to FIG. 4, in the database 34, information (user information) on the user U who uses the information processing system 100 may be registered. Examples of the user information include user ID, user name, belonging organization, operation location of the device 1, login information for using (the application of) the image capturing device 2, a type of application used in the image capturing device, the captured image 21a of the device 1, the image capturing date and time, the image capturing location, and the like. For example, by saving such user information in the database 34 also, the user information can also be referred to when the operation log 31a is reviewed later and the like.

Examples of the information stored in the storage unit 35 include a computer program 35a. The computer program 35a is a computer program (information processing program) that causes a computer to execute a process of the information processing apparatus 3. The captured image 21a transmitted from the image capturing device 2 may also be stored in the storage unit 35.

The processing unit 31 will be described in detail. The processing unit 31 generates the operation log 31a of the device 1, by identifying the operation content of the device 1, on the basis of the captured image 21a of the device 1, which is an operation target device operated by the user U, and the operation pattern information 33c of the model of the device 1. As the main process, three processes of the model identification, the individual identification, and the operation log generation will be sequentially described.

Model Identification

The processing unit 31 identifies the model of the device 1. In an embodiment, the processing unit 31 identifies the model of the device 1, on the basis of the captured image 21a and the model identification information 33a recorded in the recording unit 33.

In this example, the captured image 21a may be an image captured to identify the model of the device 1. The processing unit 23 of the image capturing device 2 generates information that prompts the user U to capture such an image (for example, an appearance image of the device 1), and causes the display unit 22 to display the image. By user operation, the image capturing unit 21 of the image capturing device 2 captures an image of the device 1, and the communication unit 25 transmits the captured image 21a to the information processing apparatus 3.

For example, the processing unit 31 retrieves a model identification image that matches with the captured image 21a transmitted from the image capturing device 2 as described above, from the model identification information 33a. In the image retrieval, various known methods such as image pattern matching may be used. The processing unit 31 identifies the model associated with the model identification image that matches with the captured image 21a, as the model of the device 1.

In the image retrieval described above, various algorithms for image recognition and the like may be used. A learned model may also be used for image recognition, and this will be described below when the operation log generation is discussed.

The model may also be identified without using the captured image 21a. For example, model information indicating the model may be transmitted to the information processing apparatus 3 from the image capturing device 2, and the model indicated in the model information may be identified as the model of the device 1, which is an operation log target. The model information may also be input to the image capturing device 2 by user operation.

In addition to the above, various methods capable of identifying the model may be used, and this will be described below when the individual identification is discussed.

The communication unit 32 may also transmit the information on the model identified by the processing unit 31 to the communication unit 25 of the image capturing device 2. The display unit 22 of the image capturing device 2 may display the information on the model. The user U can confirm whether the model identification is appropriately performed, and operate the image capturing device 2 (operate application and the like) to proceed to the next process, or if necessary, perform the model identification again.

Individual Identification

The processing unit 31 identifies individual information of the device 1, which is an operation log generation target. The individual information identification may only be performed on the device 1 that becomes the operation log generation target for the first time. When the individual information is once identified, for example, the information in which the device 1 and the individual information are associated with one another, is registered in the database 34 (initial individual registration is completed), and thereafter, the operation log can be obtained by linking the operation log with the registered individual information.

In an embodiment, the processing unit 31 identifies the individual information of the device 1, on the basis of the captured image 21a and the individual identification information 33b recorded in the recording unit 33.

In this example, the captured image 21a may be an image captured to identify the individual information of the device 1. The processing unit 23 of the image capturing device 2 may generate information that prompts the user U to capture such an image (for example, an image illustrating a unique feature of the device 1), and cause the display unit 22 to display the information. By user operation, the image capturing unit 21 of the image capturing device 2 captures an image of the device 1, and the communication unit 25 transmits the captured image 21a to the information processing apparatus 3.

For example, the processing unit 31 compares between the individual identification image of the model identified in advance, and the captured image 21a transmitted from the image capturing device 2 as described above. In image comparison, various known methods such as image pattern matching may be used. The processing unit 31 identifies the individual information associated with the individual identification image that matches with the captured image 21a, as the individual information of the device 1, which is an operation log generation target. As described above, the individual identification image is an image illustrating a unique feature of the device 1 (such as unevenness), and an individual identification method based on such a feature may also be referred to as object fingerprint authentication and the like (for example, Japanese Patent Application No. 2017-543479).

In addition to the image comparison as described above, various methods capable of identifying the individual information may be used. For example, an image recognition process may be performed on the captured image 21a. Various algorithms for image recognition and the like may be used. A learned model may also be used for image recognition, and this will be described below when the operation log generation is discussed.

The image recognition may include character recognition. The character recognition may include recognition of a character string and the like used for identifying individual information. By recognizing such a character string and the like, the individual information is identified. Such a character string and the like may be extracted from a name plate of the device 1; a seal, a label, or the like affixed to the device 1; an image of a display screen such as the display screen 1a of the device 1; and the like. The individual information may also be identified by reading a barcode, a quick response (QR) code (registered trademark), or the like provided on the device 1.

In character recognition, various algorithms such as optical character recognition (OCR) may be used. A plurality of algorithms corresponding to different character display formats (various formats such as 7 seg, 11 seg, 14 seg, and 16 seg may be included in addition to dot matrix) may be prepared. For example, according to the identified model, the processing unit 31 may extract a character using an optimal algorithm.

The method using the image recognition described above may also be applied to the model identification described above.

The individual information may also be identified without using the captured image 21a. For example, the individual information may be transmitted to the information processing apparatus 3 from the image capturing device 2, and identified as the individual information of the device 1, which is an operation log target. The individual information may also be input to the image capturing device 2 by user operation.

Moreover, the individual information may be identified from a combination of the identified model and the positional information of the device 1 (for example, positional information of the image capturing device 2 near the device 1). The positional information is provided by global positioning system (GPS) information, terrestrial magnetism information, or a combination of the GPS information and the terrestrial magnetism information. For example, the positional information is obtained by the image capturing device 2, and transmitted to the information processing apparatus 3. Because making use of such positional information has been known (for example, Japanese Patent Application Laid-open No. 2018-31599), the detailed description will be omitted here.

The communication unit 32 may also transmit the individual information identified by the processing unit 31 to the communication unit 25 of the image capturing device 2. The display unit 22 of the image capturing device 2 may display the individual information. The user U can confirm whether the individual identification is appropriately performed, and operate the image capturing device 2 (operate application and the like) to proceed to the next process, or if necessary, perform the individual identification again.

The model identification and the individual identification described above may be performed in parallel (simultaneously). For example, if the QR code or the barcode provides both of the model and individual information, the model and individual information can be identified simultaneously by reading the QR code or the barcode only once. It is to be noted that the individual identification is optional. Depending on the usage (utilization purpose and the like) of the operation log, the individual identification is necessary or unnecessary. For example, if the user wishes to distinguish between different mounting locations or the like even if the devices 1 of the same model are used, the individual identification may be performed.

Operation Log Generation

The processing unit 31 generates the operation log 31a of the device 1, by identifying the operation content of the device 1, on the basis of the captured image 21a and the model identification information 33a of the identified model.

In this example, the captured image 21a is an image captured to identify the operation of the device 1. More specifically, the captured image 21a is an image of the device 1 operated by the user U (FIG. 3 and the like). The processing unit 23 of the image capturing device 2 may generate information that prompts the user U to capture such an image, and cause the display unit 22 to display the information. By user operation, the image capturing unit 21 of the image capturing device 2 captures an image of the device 1, and the communication unit 25 transmits the captured image 21a to the information processing apparatus 3. As described above, the processing unit 23 may only extract an image of a portion (a frame and the like) necessary for identifying the operation content, and the image may be transmitted by the communication unit 25.

The processing unit 31 performs an image recognition process on the captured image 21a, and identifies the operation content of the device 1, on the basis of an image recognition result of the captured image 21a, and the operation pattern information 33c. As the image recognition process, an image recognition process capable of obtaining the image-derived information described above with reference to FIG. 7 is used. Examples of the image recognition result include the image-derived information (operation part and display of the device 1 and the like). More specifically, the image recognition result may include pressing a button, selecting an icon, displaying a character string, touch feedback, rotating a rotary switch, dragging on a touch panel, flicking on a touch panel, screen transition, and the like on the device 1.

For example, by the image recognition process, the character string displayed on the display screen 1a of the device 1 is extracted, and a screen type of the display screen 1a (setting screen and the like), the position of a finger of the user, a touch pen, and the like are identified. The processing unit 31 retrieves the operation pattern information 33c using the extracted result, the identified result, or the like as a retrieval key, and identifies the operation content. As described above with reference to FIG. 7, the operation content is associated with each of the extracted result, the identified result, and the like, or a combination of the extracted result, the identified result, and the like. Thus, the operation content is identified when the processing unit 31 refers to the operation pattern information 33c. Execution of cancellation that does not affect the operation of the device 1 may also be identified.

The processing unit 31 may also identify the operation content of the device 1, on the basis of a combination of the screen transition with the other result in the image recognition result, and the operation pattern information 33c. For example, the processing unit 31 may identify the operation content of the device 1, on the basis of a combination of at least one of pressing a button, selecting an icon, displaying a character string, touch feedback, rotating a rotary switch, dragging on a touch panel, and flicking on a touch panel on the device 1, with the screen transition, and the operation pattern information. Consequently, it is possible to identify the operation content, even it is difficult to uniquely identify the operation content only through the screen transition and the like.

A specific example will be described with reference to FIG. 8 again. When the device 1 is activated, the monitor screen 1a-2 that displays measurement values is displayed. When the display screen 1a is changed to display the menu screen 1a-1, on the basis of the image recognition result, it is identified that the display screen 1a is changed from the monitor screen 1a-2 to the menu screen 1a-1. Pressing a menu button that causes the screen transition is identified as the operation content. On the other hand, there are two operation contents of determination and cancellation that cause the setting screen 1a-3 to change to the monitor screen 1a-2. In this manner, if a plurality of operation contents are associated with a single screen transition, it is possible to identify the operation content by combining the screen transition with the other result in the image recognition result as described above, instead of only through the screen transition. For example, it is possible to identify the operation content as the determination operation, by combining with the identification such as pressing a button corresponding to determination.

Returning to FIG. 4, various known algorithms and the like may be used for image recognition. In an embodiment, a learned model may be used. For example, the learned model is generated (machine learned) using training data such that when the captured image 21a is input, the image recognition result described above is output. The processing unit 31 inputs the data corresponding to the image capturing unit 21 to the learned model, and obtains the image recognition result from the learned model.

The training data may include an image for learning. The image for learning may be classified into a type of the device 1, a type of screen displayed on the display screen 1a of the device 1 (setting screen, monitor screen, communication screen, operation screen, and the like), a selection state of the displayed content (touch feedback), an alarm issuance state, and the like. Images for learning with different conditions such as the presence of wiring, the presence of an operating finger, and the like may also be prepared.

In learning the positional identification of the finger, to be able to cope with different ethnic groups, images for learning including various fingers of different colors, shapes, and the like may be prepared, and included in the training data. To be able to cope with gloved fingers, touch pens of various shapes, and the like, images for learning including the gloved fingers, touch pens of various shapes, and the like may be prepared, and included in the training data. Images for learning including a finger with a mark and the like may also be prepared, and included in the training data.

The learned model as described above may also be used for the image recognition in the model identification and the individual identification described above.

The processing unit 31 generates the operation log 31a using the identified operation content. An example of the operation log 31a is as described above with reference to FIG. 9. For example, the processing unit 31 generates the operation log 31a described by associating the identified individual information, time, and the identified operation content with one another. For example, the time information is obtained from the captured image 21a transmitted from the image capturing device 2. As described above, the description of the individual information is optional. For example, the processing unit 31 may also generate the operation log 31a by associating the model, time, and the operation content with one another, instead of using the individual information.

The processing unit 31 registers (saves) the generated operation log 31a in the database 34. Because the image capturing device 2 can communicate with the information processing apparatus 3, for example, the user U can use the operation log 31a registered in the database 34 of the information processing apparatus 3, by operating the image capturing device 2.

The processing unit 31 may register all the generated operation log 31a in the database 34, or may only register a part of the generated operation log 31a in the database 34. For example, in the generated operation log 31a, only a portion on the specific function, operation, or the like of the device 1 may be registered in the database 34. An object to be registered may be set as appropriate.

The processing unit 31 may also perform a statistical process on the various generated operation logs 31a or on the various operation logs 31a registered in the database 34. For example, frequency of the specific operation content or the like may be calculated. Examples of the specific operation content include an operation content that may lower the operation efficiency such as a cancel operation and a redo operation. For example, the specific operation content may be used for improving the operation design of the device 1.

For example, in this manner, the operation log is generated. The generated operation log may be fed back to the user U. For example, the operation log 31a generated by the processing unit 31 is transmitted to the image capturing device 2 in real time, or the operation log 31a registered in the database 34 is transmitted to the image capturing device 2 at any time. The display unit 22 of the image capturing device 2 displays the operation log 31a. The processing unit 23 may generate display information in various formats including the operation log 31a, and cause the display unit 22 to display the information. The user U can use the displayed operation log 31a for confirmation such as prevention of debugging and erroneous operation. The processing unit 23 may also filter the displayed operation log 31a. For example, filtering content is set by the user U.

FIG. 10 to FIG. 13 are flowcharts each illustrating an example of a process (information processing method) performed in the information processing system.

Figure 10:
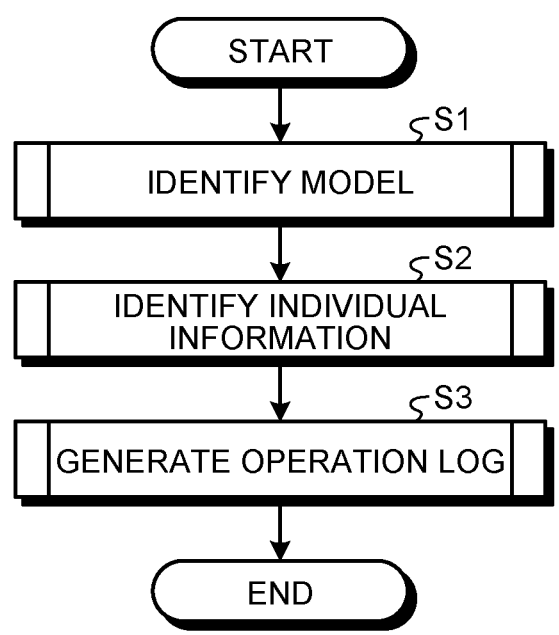
FIG. 10 is a flowchart illustrating an example of a process performed in the information processing system.

In FIG. 10, as the main processes of the information processing system 100, the model identification, the individual identification, and the operation log generation described above are illustrated. At step S1, the model is identified. At step S2, the individual information is identified. At step S3, the operation log is generated. The steps will be described with reference to FIG. 11 to FIG. 13. The descriptions of the same contents as those described above will be omitted as appropriate.

Figure 11:
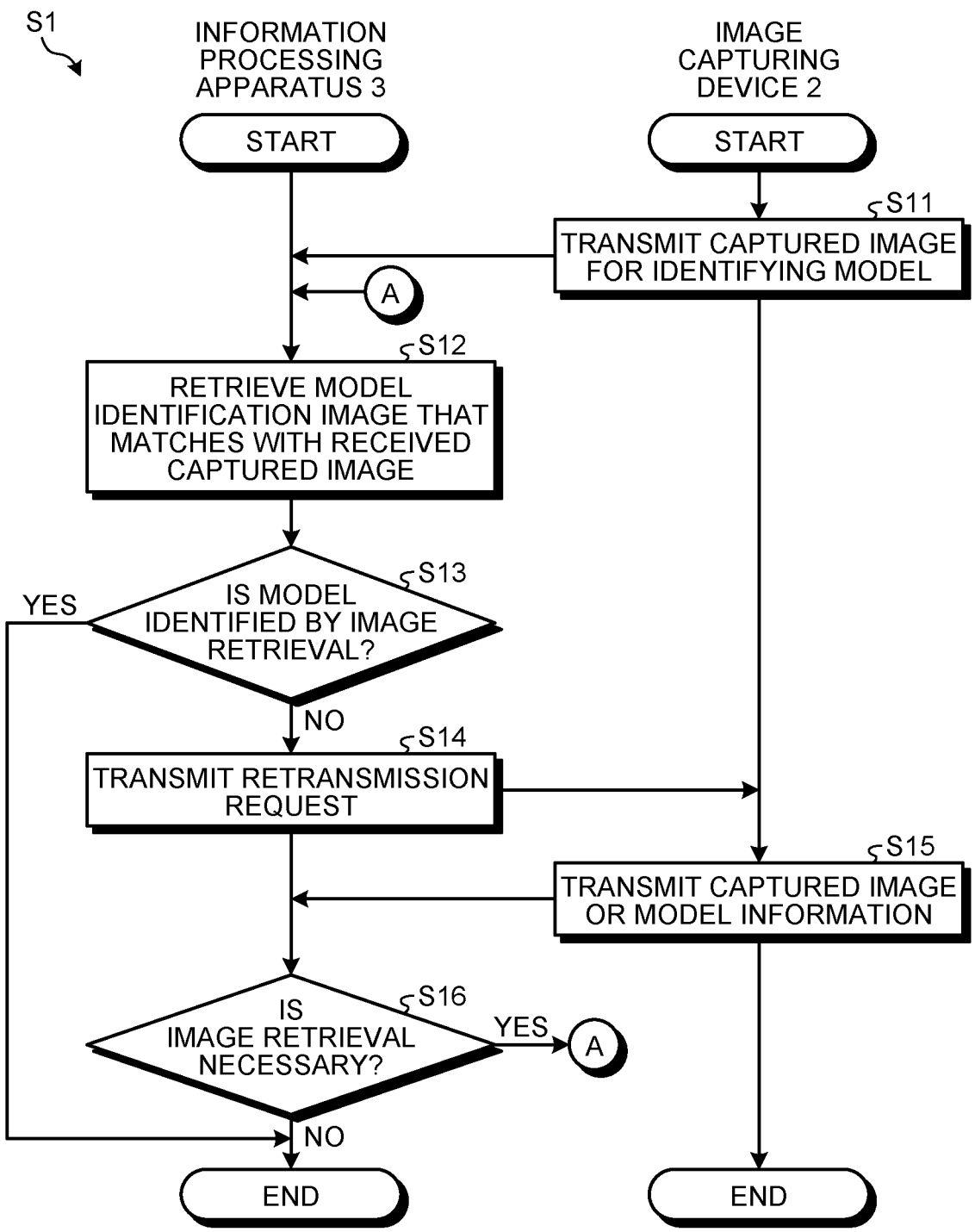
FIG. 11 is a flowchart illustrating an example of a process performed in the information processing system.

FIG. 11 illustrates a detailed flow of step S1 (FIG. 10). The step S1 includes step S11 to step S16.

At step S11, the image capturing device 2 transmits a captured image for identifying the model to the information processing apparatus 3. The information processing apparatus 3 receives the captured image transmitted from the image capturing device 2.

At step S12, the information processing apparatus 3 retrieves the model identification image that matches with the received captured image. The processing unit 31 of the information processing apparatus 3 retrieves the model identification image that matches with the captured image 21a transmitted from the image capturing device 2, from the model identification image included in the model identification information 33a in the recording unit 33. As described above, the model may be identified by the image retrieval.

At step S13, the process is branched according to whether the model is identified by the image retrieval. If the model is identified by the image retrieval (Yes at step S13), the process (process at step S1) in the flowchart is finished. If the model is not identified by the image retrieval (No at step S13), the process proceeds to step S14. The model may not be identified when the image is unclear or other reasons, for example.

At step S14, the information processing apparatus 3 transmits a retransmission request to the image capturing device 2. The processing unit 31 of the information processing apparatus 3 generates retransmission request information (such as a command), and the communication unit 32 transmits the retransmission request to the communication unit 25 of the image capturing device 2. The communication unit 25 of the image capturing device 2 receives the retransmission request, and the display unit 22 displays information indicating that the retransmission request is received and the like. The user U operates the image capturing device 2, and captures an image for identifying the model again or inputs the model information.

At step S15, the image capturing device 2 transmits the captured image or the model information to the information processing apparatus 3. The information processing apparatus 3 receives the captured image or the model information.

At step S16, the process is branched according to whether the image retrieval is necessary. If the captured image is retransmitted by the image capturing device 2, the image retrieval is necessary (Yes at step S16), and the process moves to step S12 again. If the model information is transmitted by the image capturing device 2, the model is identified, and the image retrieval is unnecessary (No at step S16). Hence, the process (process at step S1) in the flowchart is finished.

For example, in this manner, the model is identified. In the flow described above, the model information may also be transmitted at step S11. In this case, the process on the image retrieval at step S12 and the like will be skipped as appropriate.

Figure 12:
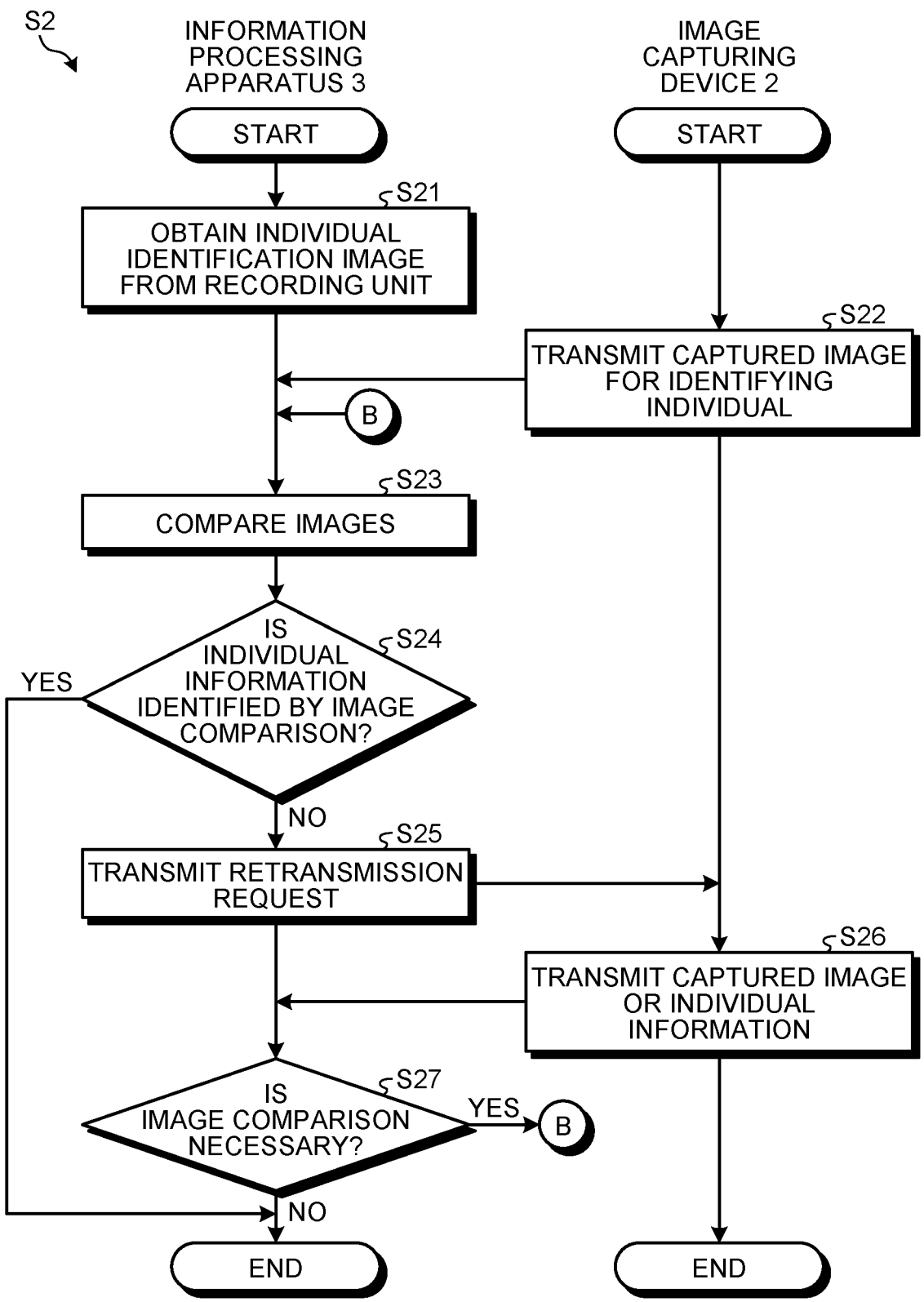
FIG. 12 is a flowchart illustrating an example of a process performed in the information processing system.

FIG. 12 illustrates a detailed flow of step S2 (FIG. 10). The step S2 includes step S21 to step S27.

At step S21, the information processing apparatus 3 obtains the individual identification image from the recording unit. The processing unit 31 of the information processing apparatus 3 obtains the individual identification image of the model identified at step S1 described above, from the individual identification information 33b of the recording unit 33.

At step S22, the image capturing device 2 transmits the captured image for identifying the individual, to the information processing apparatus 3. The information processing apparatus 3 receives the captured image transmitted from the image capturing device 2.

At step S23, the information processing apparatus 3 compares images. The processing unit 31 of the information processing apparatus 3 compares between the individual identification image obtained at step S21 described above, and the captured image transmitted from the image capturing device 2 at step S22 described above. As described above, the individual information may be identified by the image comparison.

At step S24, the process is branched according to whether the individual information is identified by the image comparison. If the individual information is identified by the image comparison (Yes at step S24), the process (process at step S2) in the flowchart is finished. If the individual information is not identified by the image comparison (No at step S24), the process proceeds to step S25. For example, the individual information may not be identified when the image is unclear or other reasons.

At step S25, the information processing apparatus 3 transmits a retransmission request to the image capturing device 2. The user U operates the image capturing device 2, and captures an image for identifying the individual information again or inputs the individual information.

At step S26, the image capturing device 2 transmits the captured image or the individual information to the information processing apparatus 3. The information processing apparatus 3 receives the captured image or the individual information.

At step S27, the process is branched according to whether the image comparison is necessary. If the captured image is retransmitted by the image capturing device 2, the image comparison is necessary (Yes at step S27). Hence, the process moves to step S23 again. If the individual information is transmitted by the image capturing device 2, the individual information is identified, and the image comparison is unnecessary (No at step S27). Hence, the process (process at step S2) in the flowchart is finished.

For example, in this manner, the individual information is identified. In the flow described above, the individual information may also be transmitted at step S22. In this case, the process on the image comparison at step S23 and the like will be skipped as appropriate.

Figure 13:
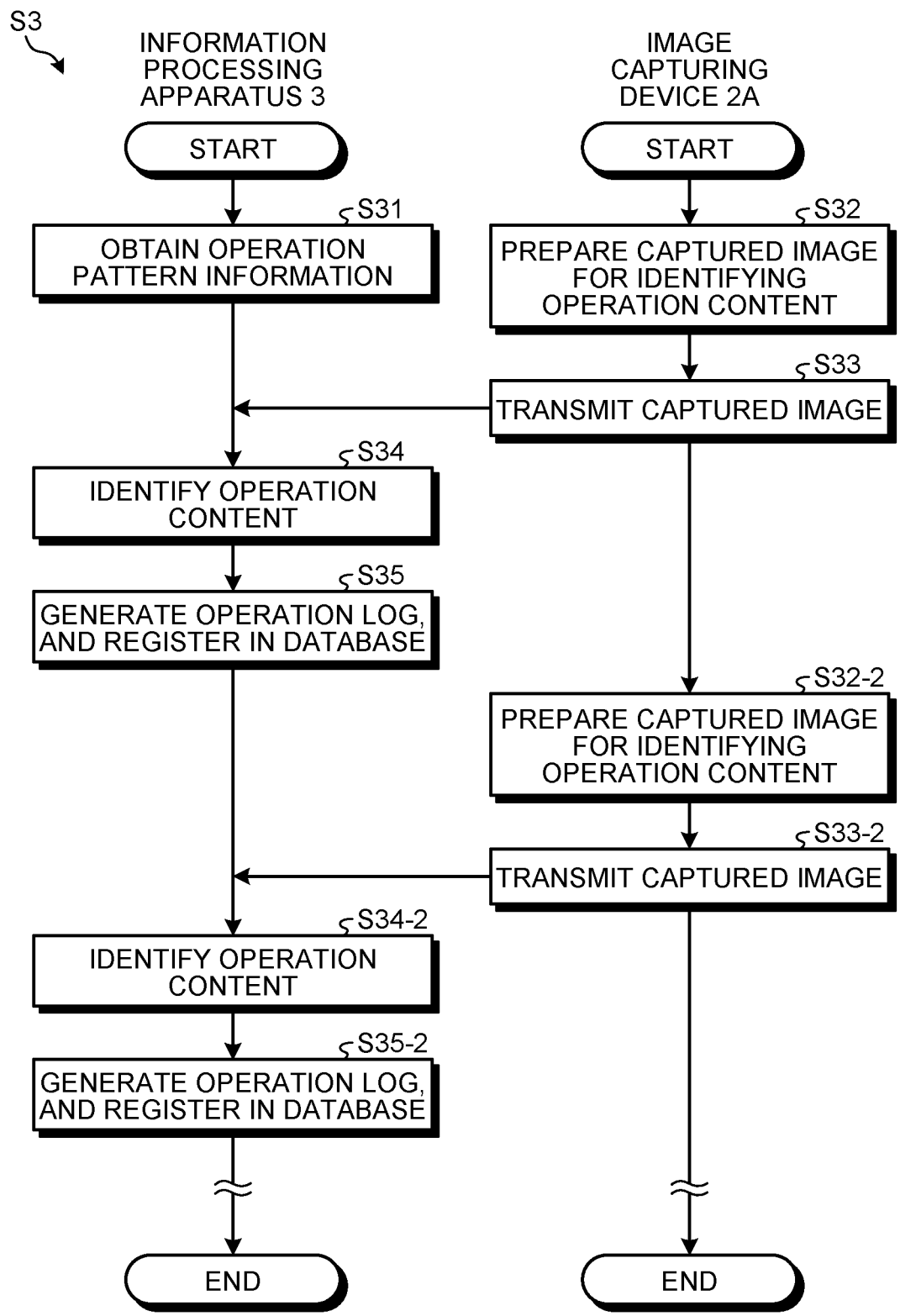
FIG. 13 is a flowchart illustrating an example of a process performed in the information processing system.

FIG. 13 illustrates a detailed flow of step S3 (FIG. 10). The step S3 includes step S31 to step S35 and the like.

At step S31, the information processing apparatus 3 obtains operation pattern information. The processing unit 31 of the information processing apparatus 3 obtains the operation pattern information 33c of the model identified at step S1 described above, from the recording unit 33.

At step S32, the image capturing device 2 prepares a captured image for identifying the operation content. The image capturing unit 21 of the image capturing device 2 captures an image of the device 1 operated by the user U. According to the needs, the processing unit 23 only extracts a part of the captured image 21a of the image capturing unit 21.

At step S33, the image capturing device 2 transmits the captured image to the image processing apparatus 3. The communication unit 25 of the image capturing device 2 transmits the captured image 21a prepared at step S32 described above, to the communication unit 32 of the image processing apparatus 3. The communication unit 32 of the information processing apparatus 3 receives the captured image 21a.

At step S34, the information processing apparatus 3 identifies the operation content. The processing unit 31 of the information processing apparatus 3 identifies the operation content of the device 1, on the basis of the operation pattern information 33c obtained at step S31 described above, and the captured image 21a transmitted from the image capturing device 2 at step S33 described above.

At step S35, the information processing apparatus 3 generates an operation log, and registers the generated operation log in the database. The processing unit 31 of the information processing apparatus 3 generates the operation log 31a on the basis of the operation content identified at step S34 described above, and registers the operation log 31a in the database 34.

The processes from step S32 to step S35 described above are repeatedly executed. For example, if the processes from step S32 to step S35 are executed for the second time, the processes are illustrated as step S32-2 to step S35-2. If the process on the operation log generation is finished when the captured image is no longer transmitted from the image capturing device 2 and the like, the process (process at step S3) in the flowchart is finished.

For example, in this manner, the operation content of the device 1 is identified, and the operation log 31a of the device 1 is generated.

According to the information processing system 100 describe above, it is possible to generate and obtain (collect) the operation log 31a of the device 1, even if the device 1 cannot generate or output an operation log. There is no need to add a firmware function and the like to the device 1. Because the model identification, the individual identification, the operation log generation, and the like are automatically performed using the captured image 21a obtained by capturing an image of the device 1, it is possible to reduce the time and effort of the user U to minimum. Even if identification information (such as a barcode and a QR code) is not marked on the main body or the like, it is possible to identify the individual information and include the individual information in the operation log 31a. The information (captured image 21a) of the device 1 can be obtained without being connected to or without communicating with the device 1, and is linked to the external information (such as information in the information processing apparatus 3). Hence, the processing load of the device 1 does not increase. Because the operation log 31a is registered (saved) in the database 34, for example, it is possible to confirm the operation (includes setting change and the like) performed by the user U on the device 1 in the past.

As described above, an embodiment of the present disclosure has been described. However, the disclosed technology is not limited to the embodiment described above. Some modifications will now be described.

In an embodiment, as an evidence of the operation log 31a, the captured image 21a (video) that indicates the whole operation of the device 1 may be saved. To save the captured image 21a (video), a dedicated database may be used. This will be described with reference to FIG. 14.

Figure 14:
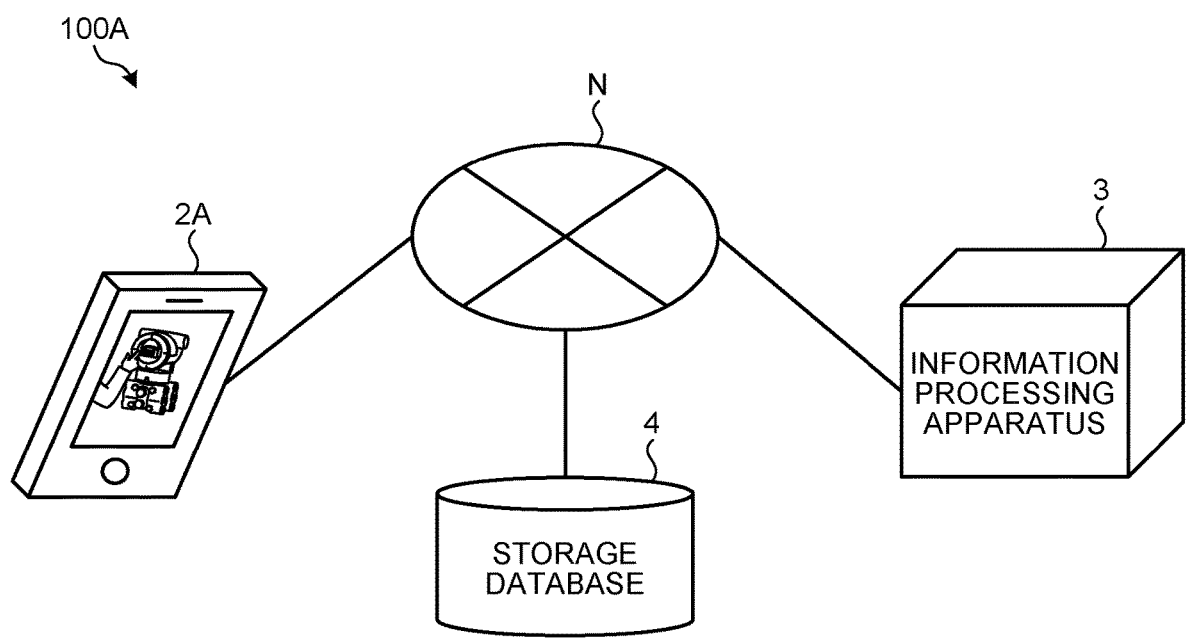
FIG. 14 is a diagram illustrating an example of a schematic configuration of an information processing system according to a modification.

FIG. 14 is a diagram illustrating an example of a schematic configuration of an information processing system according to a modification. For example, an information processing system 100A is different from the information processing system 100 (FIG. 1) in including an image capturing device 2A instead of the image capturing device 2, and in further including a storage database 4.

The storage database 4 is connected to the image capturing device 2 and the information processing apparatus 3 via the network N. During the operation log generation, the image capturing device 2A also transmits the captured image of the image capturing unit 21 to the storage database 4. The storage database 4 saves the captured image. The function of the storage database 4 may also be incorporated into the information processing apparatus 3 (for example, into the database 34).

In the information processing system 100A, in the process of the operation log generation (step S3 in FIG. 10 and FIG. 13), a process of saving the captured image 21a in the storage database 4 is added.

Figure 15:
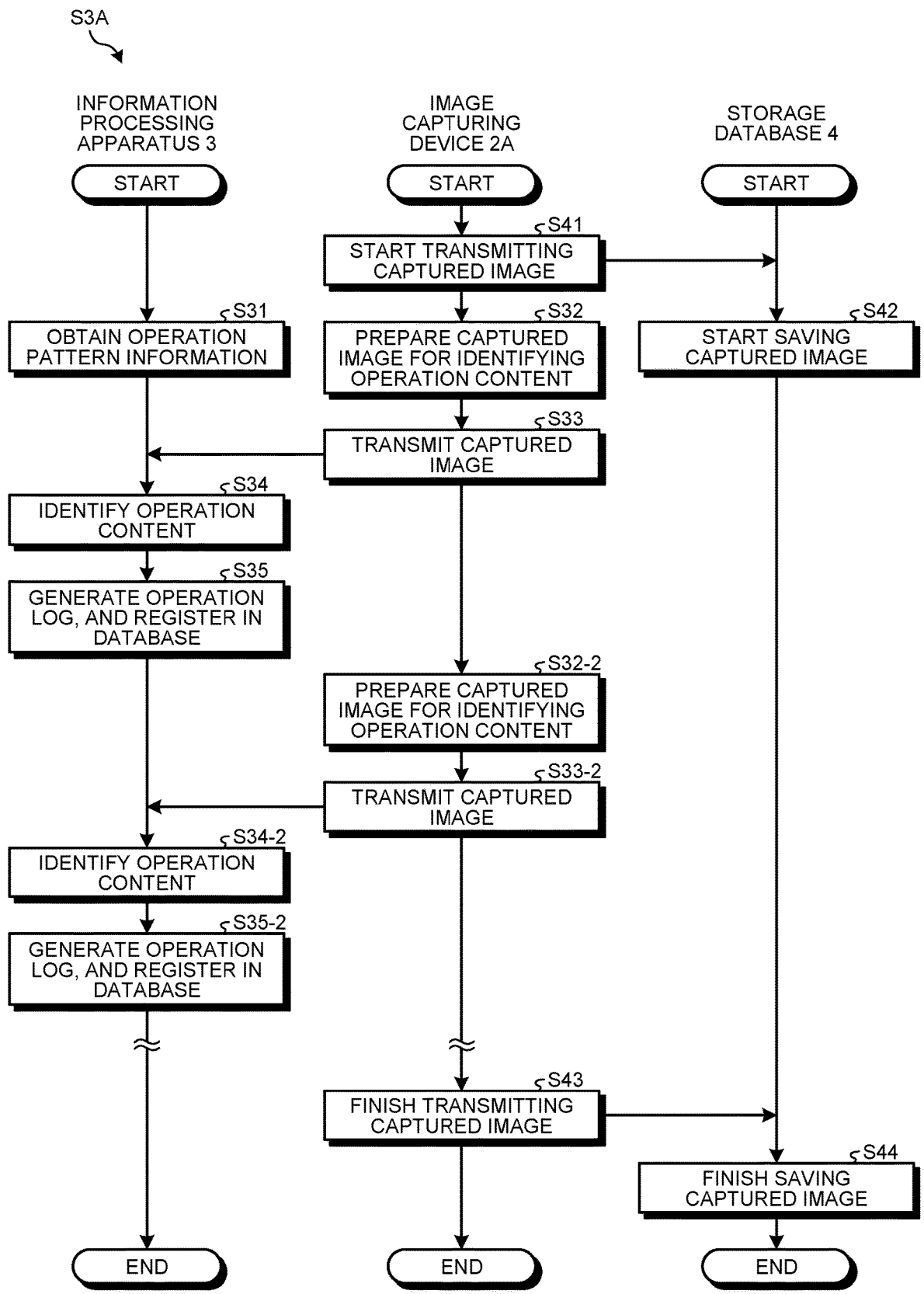
FIG. 15 is a flowchart illustrating an example of a process (information processing method) performed in the information processing system.

FIG. 15 is a flowchart illustrating an example of a process (information processing method) performed in the information processing system. For example, the process at step S3A is different from that at step S3 (FIG. 13) in further including processes from step S41 to step S44.

At step S41, the image capturing device 2A starts transmitting a captured image. The image capturing unit 21 of the image capturing device 2A obtains the captured image 21a of the device 1 operated by the user U, and transmits the captured image 21a to the storage database 4. The storage database 4 receives the captured image 21a.

At step S42, the storage database 4 starts saving the captured image. The storage database 4 saves the captured image 21a transmitted from the image capturing device 2A.

The details of the processes from step S31 to step S35 and the like are as described above with reference to FIG. 12. Hence, the description will not be repeated here.

At step S43, the image capturing device 2A finishes transmitting the captured image 21a to the storage database 4.

At step S44, the storage database 4 finishes saving the captured image 21a.

For example, in this manner, the captured image 21a (video) that indicates the whole operation of the device 1 performed by the user U is saved in the storage database 4 as an evidence of the operation log 31a.

In the above, the captured image 21a is transmitted to and saved in the storage database 4 in real time. However, the captured image 21a may also be stored in the storage unit 24 of the image capturing device 2, and then collectively transmitted to and saved in the storage database 4 afterward (for example, at step S43).

The storage database 4 may also save the captured image 21a by adding a time stamp of the operation log generation time (operation log acquisition time) to the captured image 21a. Consequently, it is possible to retrieve the captured image 21a, which will be an evidence of the operation log 31a at any optional time, and the like.

In an embodiment, the functions of the image capturing device 2 and the information processing apparatus 3 may be integrated into one of the image capturing device 2 and the information processing apparatus 3. For example, the function of the information processing apparatus 3 may be incorporated into the image capturing device 2. Alternatively, the function of the image capturing device 2 may be incorporated into the information processing apparatus 3. By doing so, a network environment for connecting the image capturing device 2 and the information processing apparatus 3 will become unnecessary. This will be described with reference to FIG. 16.

Figure 16:
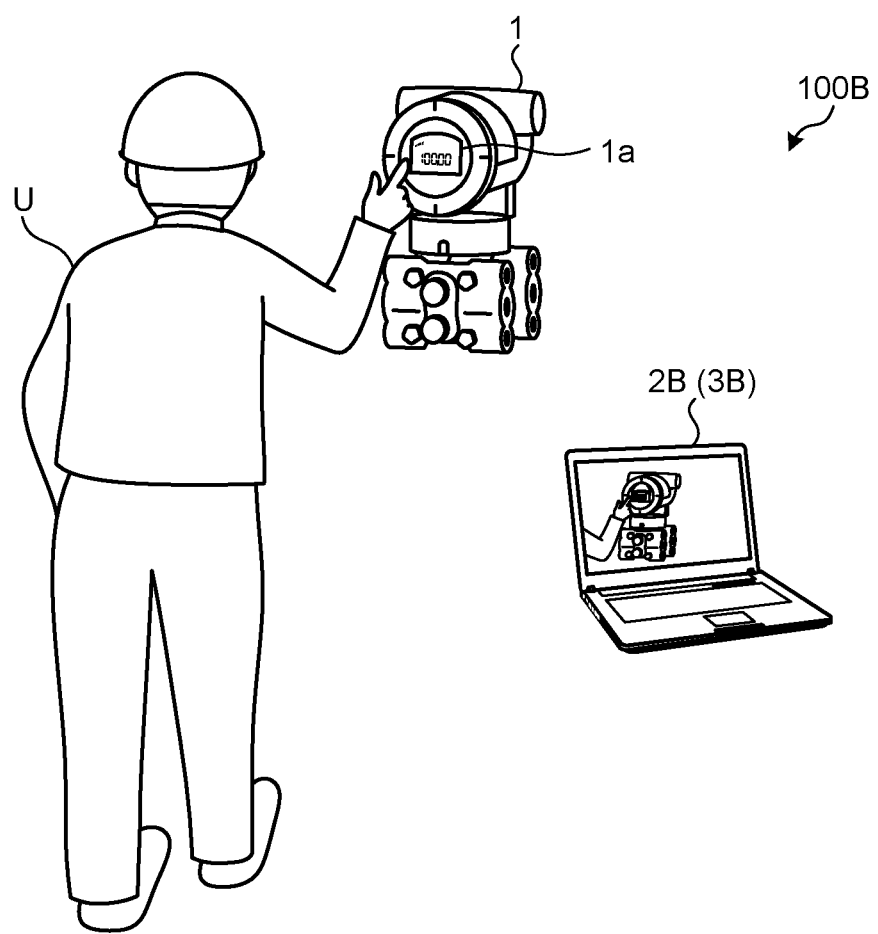
FIG. 16 is a diagram illustrating an example of a schematic configuration of an information processing system according to a modification.

FIG. 16 is a diagram illustrating an example of a schematic configuration of an information processing system according to a modification. For example, in an information processing system 100B, the functions of the image capturing device 2 and the information processing apparatus 3 that have been described above are integrated into an image capturing device 2B (or in an information processing apparatus 3B). Hence, it is possible to generate the operation log of the device 1, even if there is no communication via the network N as illustrated in FIG. 1 described above.

In an embodiment, the communication function with the information processing apparatus 3 at the image capturing device 2 side may be provided outside of the image capturing device 2. This will be described with reference to FIG. 17.

Figure 17:
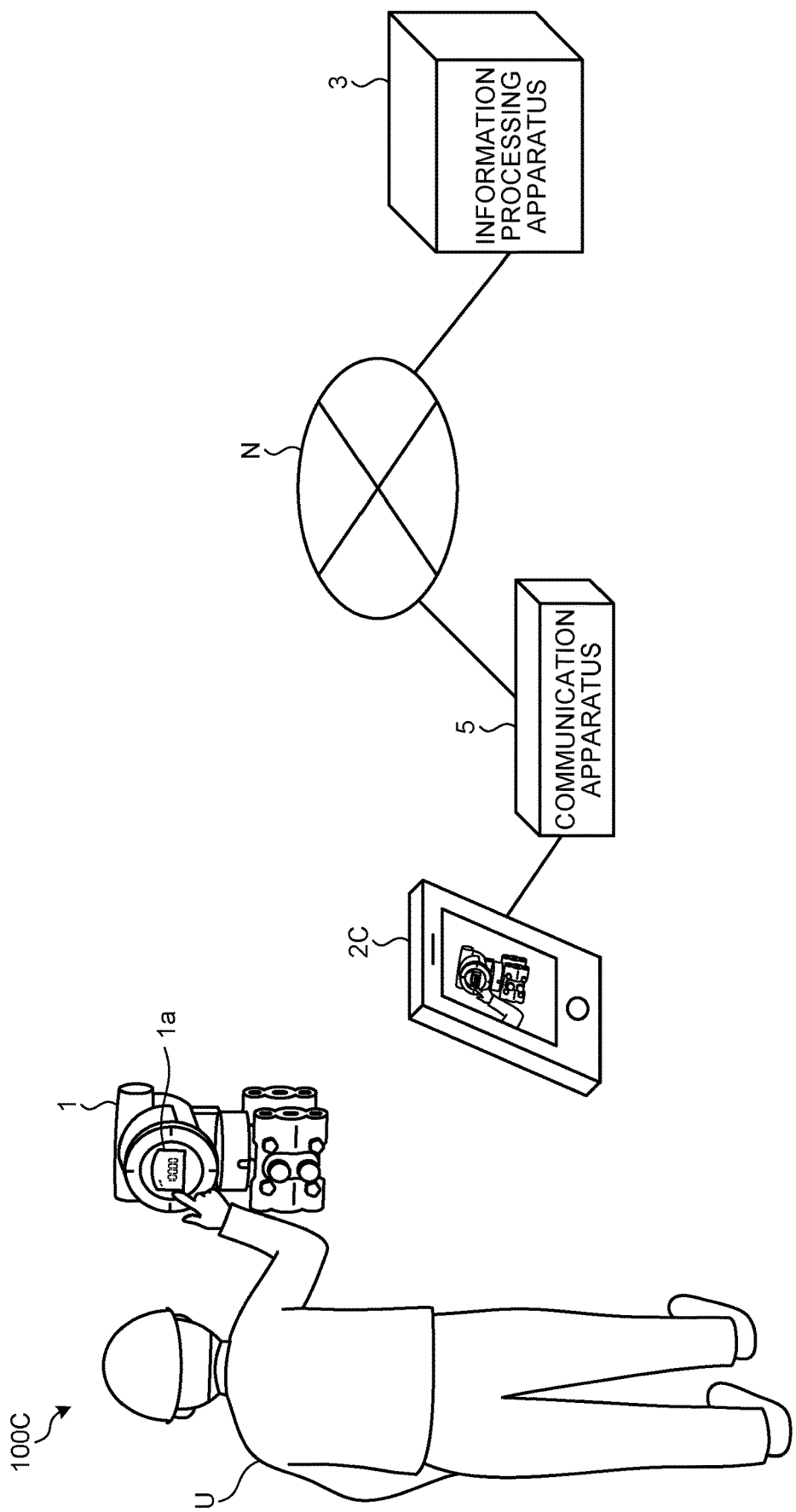
FIG. 17 is a diagram illustrating an example of a schematic configuration of an information processing system according to a modification.

FIG. 17 is a diagram illustrating an example of a schematic configuration of an information processing system according to a modification. For example, in an information processing system 100C, an image capturing device 2c is connected to a communication apparatus 5. The communication apparatus 5 is communicably connected to the information processing apparatus 3 via the network N. The image capturing device 2C communicates with the information processing apparatus 3 using the communication apparatus 5. For example, a camera, a video camera, and the like may be used as the image capturing device 2C. A PC and the like may be used as the communication apparatus 5. Similar to what has been described above, it is possible to obtain the operation log 31a of the device 1, by combining an apparatus having an image capturing function and an apparatus having a communication function.

In an embodiment, the process performed by the information processing apparatus 3 may be implemented by cloud computing and the like. For example, part or all of the functions of the processing unit 31, the recording unit 33, and the database 34 of the information processing apparatus 3 may be provided on an external apparatus of the information processing apparatus 3. The information processing apparatus 3 may execute the above-described process, by communicating with such an external apparatus. The above-described process may also be executed, when the image capturing device 2 directly communicates with such an external apparatus.

Figure 18:
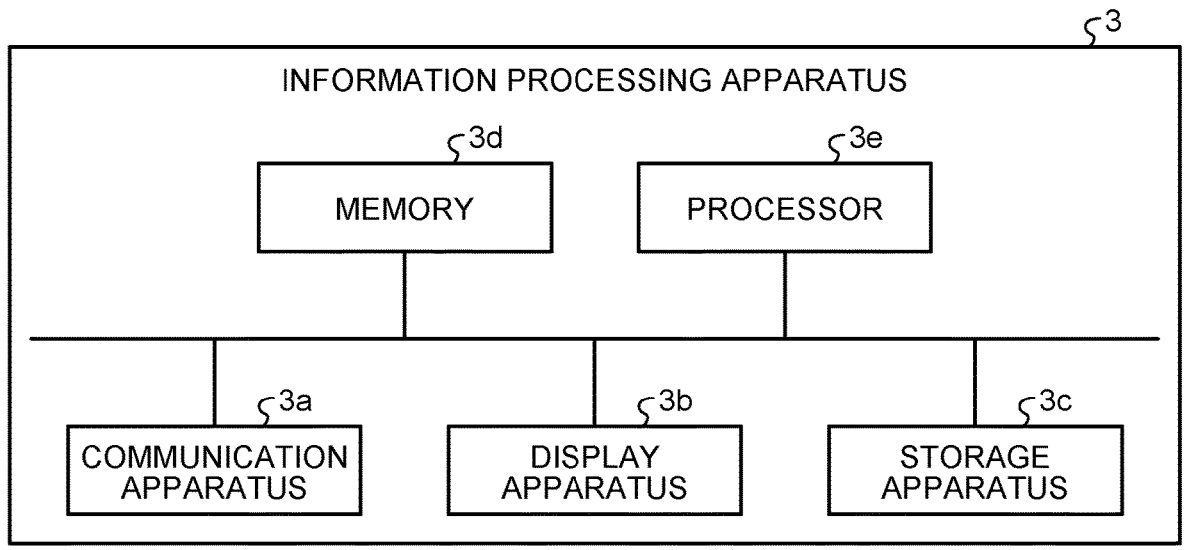
FIG. 18 is a diagram illustrating an example of a hardware configuration of the information processing apparatus.

FIG. 18 is a diagram illustrating an example of a hardware configuration of the information processing apparatus. For example, a computer or the like having such a hardware configuration functions as the information processing apparatus 3 described above. Examples of the hardware configuration include a communication apparatus 3a, a display apparatus 3b, a storage apparatus 3c, memory 3d, a processor 3e, and the like connected to each other via a bus or the like. For example, the storage apparatus 3c is a hard disk drive (HDD), a read only memory (ROM), a random access memory (RAM), and the like. The memory 3d may also be included in the storage apparatus 3c.

The communication apparatus 3a is a network interface card and the like, and enables communication with other apparatuses. For example, the display apparatus 3b is a touch panel, a display, and the like. The storage apparatus 3c functions as the recording unit 33, the database 34, the storage unit 35, and the like.

The processor 3e causes a computer to function as the information processing apparatus 3, by reading the computer program 35a (FIG. 4) from the storage apparatus 3c and the like, and developing the computer program 35a on the memory 3d. The function includes the function of the processing unit 31 as described above.

The computer program 35a can be distributed via a network such as the Internet. Moreover, the computer program 35a may be recorded on a computer-readable recording medium such as a hard disk, a flexible disc (FD), a compact disc read-only memory (CD-ROM), a magneto-optical disk (MO), a digital versatile disc (DVD), and the like, and may be executed by being read out from the recording medium by a computer.

In addition to the information processing apparatus 3, for example, an apparatus such as the image capturing device 2 may also have the same hardware configuration as described above.

For example, the technology described above can be identified as follows: as described with reference to FIG. 1 to FIG. 9 and the like, the information processing apparatus 3 includes the processing unit 31 that generates the operation log 31a of the operation target device 1 operated by the user U, by identifying the operation content of the operation target device 1, on the basis of the captured image 21a obtained by capturing an image of the operation target device 1, and the operation pattern information 33c of the model of the operation target device 1.

According to the information processing apparatus 3 described above, the operation log 31a of the operation target device 1 is generated from the captured image 21a of the operation target device 1. Thus, it is possible to obtain the operation log 31a of the device 1 (the device 1 that does not have an operation log sweep function, and the like), even if the device 1 cannot generate or output an operation log.

As described with reference to FIG. 7 and the like, the operation pattern information 33c is information in which the model, the image-derived information that can be obtained from the image of the device of the model, and the operation content are associated with one another. The processing unit 31 may identify the operation content of the operation target device 1, on the basis of the image recognition result of the operation log 31a and the operation pattern information 33c. For example, the processing unit 31 can identify the operation content of the operation target device 1, by using the image recognition result and the operation pattern information 33c in this manner.

As described with reference to FIG. 7 and the like, the image-derived information in the operation pattern information 33c may include at least one of the operation part and display of the device, and the image recognition result may include at least one of the operation part of the operation target device 1, and display of the operation target device 1. The image-derived information may include at least one of pressing a button, selecting an icon, displaying a character string, touch feedback, rotating a rotary switch, dragging on a touch panel, flicking on a touch panel, and screen transition on a device. The image recognition result may include at least one of pressing a button, selecting an icon, displaying a character string, touch feedback, rotating a rotary switch, dragging on a touch panel, flicking on a touch panel, and screen transition on the operation target device 1. For example, it is possible to identify the operation content of the operation target device 1, by using such image-derived information alone or in combination with other pieces of information.

As described with reference to FIG. 7, FIG. 8, and the like, the processing unit 31 may identify the operation content of the operation target device 1, on the basis of a combination of at least one of pressing a button, selecting an icon, displaying a character string, touch feedback, rotating a rotary switch, dragging on a touch panel, and flicking on a touch panel with the screen transition on the operation target device 1 in the image recognition result, and the operation pattern information 33c. Consequently, it is possible to identify the operation content of the operation target device 1, even if it is difficult to uniquely identify the operation content only through the screen transition and the like.

As described with reference to FIG. 5 and the like, the processing unit 31 may identify the model of the operation target device 1, on the basis of the captured image 21a and the model identification image (for example, included in the model identification information 33a of the recording unit 33), and identify the operation content of the operation target device 1, on the basis of the captured image 21a and the operation pattern information 33c of the identified model. Consequently, it is possible to identify the model of the operation target device 1, from the captured image 21a.

As described with reference to FIG. 6, FIG. 9, and the like, the processing unit 31 may identify the individual information of the operation target device 1, on the basis of the captured image 21a and the individual identification image (for example, included in the individual identification information 33b of the recording unit 33) illustrating a unique feature of the device, and generate the operation log 31a by associating the identified individual information with the identified operation content. Consequently, it is possible to identify the individual information of the operation target device 1 from the captured image 21a, and generate the operation log 31a identified by the individual information.

As described with reference to FIG. 4 and the like, the processing unit 31 may register the generated operation log 31a in the database 34 so that the user U can use the operation log 31a. Consequently, it is possible to feed back the generated operation log 31a to the user U.

The information processing method described with reference to FIG. 10 to FIG. 13 and the like, is also an embodiment. The information processing method generates the operation log 31a of the operation target device 1 operated by the user U, by identifying the operation content of the operation target device 1, on the basis of the captured image 21a obtained by capturing an image of the operation target device 1, and the operation pattern information 33c of the model of the operation target device (step S3, step S34, and step S35). As described above, by using such an information processing method, it is also possible to obtain the operation log 31a of the device 1, even if the device 1 cannot generate or output an operation log.

The computer program 35a described with reference to FIG. 4, FIG. 18, and the like is also an embodiment. The computer program 35a is an information processing program that causes a computer to execute a process of generating the operation log 31a of the operation target device 1 operated by the user U, by identifying the operation content of the operation target device 1, on the basis of the captured image 21a obtained by capturing an image of the operation target device 1, and the operation pattern information 33c of the model of the operation target device 1. As described above, by using such a computer program 35a, it is also possible to obtain the operation log 31a of the device 1, even if the device 1 cannot generate or output an operation log. As described with reference to FIG. 18 and the like, the recording medium recorded with the computer program 35a is also an embodiment.

The information processing system 100 described with reference to FIG. 1 and the like is also an embodiment. The information processing system 100 includes the image capturing device 2 that captures an image of the operation target device 1 operated by the user U, and the information processing apparatus 3 that generates the operation log 31a of the operation target device 1, by identifying the operation content of the operation target device 1, on the basis of the captured image 21a of the operation target device 1 captured by the image capturing device 2, and the operation pattern information 33c of the model of the operation target device 1. As described above, by using such an information processing system 100, it is also possible to obtain the operation log 31a of the device 1, even if the device 1 cannot generate or output an operation log.

The disclosed technology may be identified as follows: the information processing system 100 includes the image capturing device 2 that captures an image of the device 1, a related program (for example, the computer program 35a) that causes a computer to receive the captured image 21a captured by the image capturing device 2 (for example, via application of the image capturing device 2), the recording unit 33 in which the model (product ID and the like) and the display screen information and the like linked to the model are recorded, and the database for registering the operation log 31a of the device 1. The related program identifies the model by analyzing the received captured image 21a, retrieves one or more of information on the display character string, display icon, information on the image, information on the type of display screen, and information on the screen transition linked to the model, from the recording unit 33, and obtains the operation log 31a of the device 1 using the retrieved information.

The image capturing unit 21 of the image capturing device 2 may capture an image including at least one of the QR code affixed to the device 1, the display screen 1a, all or part of the device 1, shape, displayed character string, barcode, name plate, color, icon, displayed image, a type of screen being displayed, gesture information of the user U, and the like, as the captured image 21a.

The captured image 21a may be obtained by means of a photograph, a screen shot, a scanned image, a video frame, an image or a video (moving images) created by a content authoring application, and the like.

The image capturing device may have a configuration in which a photographing device such as a video and a camera is combined with a PC and the like.

All or part of the functions of the recording unit 33, the database 34, and the computer program 35a may be provided in the image capturing device 2, in the information processing apparatus 3 connected to the image capturing device 2 via the network N, in the storage database 4, in another external storage, and the like.

In the image analysis of the captured image 21a (for example, the image recognition process performed by the processing unit 31 of the information processing apparatus 3, and the like), one or more of the shape of the device 1, the displayed character string, identification information such as a QR code, color, icon, displayed image, a type of screen being displayed, and the like, may be analyzed, and used as a retrieval key of the recording unit 33.

In the identification of the model (product ID and the like), for example, the model information manually input to the image capturing device 2 by the user U may be obtained by communication in addition to image analysis. In this case, there is no need to capture an image for identifying the model.

In the recording unit 33, information (for example, the model identification information 33a) including at least one of a display character string, a type of display screen, a type of display icon, a type of input component such as a hardware/software button, a type of menu, a display method of touch feedback, and screen transition on the device may be recorded.

Image data of an identification unit for individual identification, feature point information (unevenness and the like) extracted from the image data, and the like may be recorded in or associated with the recording unit 33.

At least one of the user ID of the user, user name, belonging organization, operation location, login information for using the application in the image capturing device, the type of application being used, a captured image of the operation target device 1, the image capturing date and time, and the image capturing location may be registered in the database 34.

The captured image 21a; the model identified from the captured image 21a; the individual information; information on the captured image 21a, the model identified from the captured image 21a, and the individual information input to the application (image capturing device 2); the image analysis result of the captured image 21a; the generated operation log 31a, and the like may be registered (collected and the like) in the database such as the database 34 and the storage database 4. The information registered in the database and the like may be retrieved.

The information registered in the database, the retrieved information, and the like may be statistically processed.

For example, the recording unit 33 may be a storage area that can only Read in which information is recorded in advance. The database 34 may be a storage area that can Read and Write such that information can be collected, retrieved, and the like.

What is claimed is:

1. An information processing apparatus comprising:
a processing unit that generates an operation log of an operation target device which cannot generate or output the operation log, by identifying an operation content of the operation target device operated by a user, based on (i) a captured image obtained by capturing an image of the operation target device, and (ii) operation pattern information of the operation target device stored in a recording unit in advance, wherein
the captured image includes an image of the user and the image of the operation target device,
the operation pattern information is information in which (i) the operation content of the operation target device and (ii) image-derived information capable of being obtained from the image of the user and the image of the operation target device are associated with one another,
the image-derived information includes at least one of (i) a pattern of a finger or a touch pen used for operation, (ii) a gesture of a person, (iii) the person rotating a switch of the operation target device, (iV) the person dragging on a touch panel of the operation target device, and (V) the person flicking on the touch panel, and
the processing unit identifies the image-derived information by performing an image recognition process on the captured image, retrieves the operation pattern information using the identified image-derived information as a retrieval key, and then identifies the operation content which is associated with the identified image-derived information in the operation pattern information.

2. The information processing apparatus according to claim 1, wherein
the operation pattern information is information in which a model, the image-derived information capable of being obtained from the image of the user and the image of the operation target device of the model, and the operation content are associated with one another, and
the processing unit identifies the operation content of the operation target device, based on an image recognition result of the captured image and the operation pattern information.

3. The information processing apparatus according to claim 2, wherein
the image-derived information in the operation pattern information includes at least one of an operation part of a device and display of a device, and
the image recognition result includes at least one of an operation part of the operation target device and display of the operation target device.

4. The information processing apparatus according to claim 2, wherein
the image-derived information further includes at least one of pressing a button, selecting an icon, displaying a character string, touch feedback, and screen transition on a device, and
the image recognition result includes at least one of pressing a button, selecting an icon, displaying a character string, touch feedback, rotating a rotary switch, dragging on a touch panel, flicking on a touch panel, and screen transition on the operation target device.

5. The information processing apparatus according to claim 4, wherein
the image recognition result includes the screen transition on the operation target device and at least one of pressing the button, selecting the icon, displaying the character string, the touch feedback, rotating the rotary switch, dragging on the touch panel, and flicking on the touch panel on the operation target device, and
the processing unit identifies the operation content of the operation target device, based on a combination of at least one of pressing the button, selecting the icon, displaying the character string, the touch feedback, rotating the rotary switch, dragging on the touch panel, and flicking on the touch panel on the operation target device, with the screen transition on the operation target device, in the image recognition result, and the operation pattern information.

6. The information processing apparatus according to claim 1, wherein
the processing unit
identifies a model of the operation target device, based on the captured image and a model identification image, and identifies the operation content of the operation target device, based on the captured image and operation pattern information of the identified model.

7. The information processing apparatus according to claim 1, wherein
the processing unit
identifies individual information of the operation target device, based on the captured image and an individual identification image illustrating a unique feature of the device, and
generates the operation log by associating the identified individual information with the identified operation content.

8. The information processing apparatus according to claim 1, wherein the processing unit registers the generated operation log in a database so that the user is capable of using the operation log.

9. The information processing apparatus according to claim 1, wherein the operation log indicates an operation history of the operation target device in which an operation time and the operation content are associated with each other.

10. The information processing apparatus according to claim 1, wherein
in the captured image, only an image of a portion necessary for identifying a model and an image of a portion necessary for identifying the operation content and optionally an image of a portion necessary for identifying an individual device are extracted,
the image of the portion necessary for identifying the operation content includes at least one of a finger of the user or a touch pen, and
the processing unit performs the image recognition process on the extracted image of the portion necessary for identifying the model and the extracted image of the portion necessary for identifying the operation content and optionally the extracted image of the portion necessary for identifying the individual device.

11. The information processing apparatus according to claim 1, wherein
the processing unit calculates frequency of a specific operation content in the operation log.

12. An information processing method comprising:
generating an operation log of an operation target device which cannot generate or output the operation log, by identifying an operation content of the operation target device operated by a user, based on (i) a captured image obtained by capturing an image of the operation target device, and (ii) operation pattern information of the operation target device stored in a recording unit in advance, wherein
the captured image includes an image of the user and the image of the operation target device,
the operation pattern information is information in which (i) the operation content of the operation target device and (ii) image-derived information capable of being obtained from the image of the user and the image of the operation target device are associated with one another,
the image-derived information includes at least one of (i) a pattern of a finger or a touch pen used for operation, (ii) a gesture of a person, (iii) the person rotating a switch of the operation target device, (iV) the person dragging on a touch panel of the operation target device, and (V) the person flicking on the touch panel, and the method further comprises:
identifying the image-derived information by performing an image recognition process on the captured image;
retrieving the operation pattern information using the identified image-derived information as a retrieval key; and then
identifying the operation content which is associated with the identified image-derived information in the operation pattern information.

13. A computer-readable recording medium having stored therein an information processing program that causes a computer to execute a process of generating an operation log of an operation target device which cannot generate or output the operation log, by identifying an operation content of the operation target device operated by a user, based on (i) a captured image obtained by capturing an image of the operation target device, and (ii) operation pattern information of the operation target device stored in a recording unit in advance, wherein
the captured image includes an image of the user and the image of the operation target device,
the operation pattern information is information in which (i) the operation content of the operation target device and (ii) image-derived information capable of being obtained from the image of the user and the image of the operation target device are associated with one another,
the image-derived information includes at least one of (i) a pattern of a finger or a touch pen used for operation, (ii) a gesture of a person, (iii) the person rotating a switch of the operation target device, (iv) the person dragging on a touch panel of the operation target device, and (V) the person flicking on the touch panel, and
the information processing program causes the computer to further execute:
identifying the image-derived information by performing an image recognition process on the captured image;
retrieving the operation pattern information using the identified image-derived information as a retrieval key; and then
identifying the operation content which is associated with the identified image-derived information in the operation pattern information.

14. An information processing system comprising:
an image capturing device that captures an image of an operation target device operated by a user, and
an information processing apparatus that generates an operation log of the operation target device which cannot generate or output the operation log, by identifying an operation content of the operation target device operated by the user, based on (i) a captured image of the operation target device captured by the image capturing device, and (ii) operation pattern information of the operation target device stored in a recording unit in advance, wherein
the captured image includes an image of the user and the image of the operation target device,
the operation pattern information is information in which (i) the operation content of the operation target device and (ii) image-derived information capable of being obtained from the image of the user and the image of the operation target device are associated with one another,
the image-derived information includes at least one of (i) a pattern of a finger or a touch pen used for operation, (ii) a gesture of a person, (iii) the person rotating a switch of the operation target device, (iv) the person dragging on a touch panel of the operation target device, and (V) the person flicking on the touch panel, and the information processing apparatus identifies the image-derived information by performing an image recognition process on the captured image, retrieves the operation pattern information using the identified image-derived information as a retrieval key, and then identifies the operation content which is associated with the identified image-derived information in the operation pattern information.

* * * * *